United States Patent
Natkovich et al.

(10) Patent No.: US 9,268,716 B2
(45) Date of Patent: Feb. 23, 2016

(54) WRITING DATA FROM HADOOP TO OFF GRID STORAGE

(71) Applicant: Yahoo! Inc., Sunnyvale, CA (US)

(72) Inventors: Michael Natkovich, San Francisco, CA (US); Ravi Sankuratri, Karnatake (IN)

(73) Assignee: Yahoo! Inc., Sunnyvale, CA (US)

( * ) Notice: Subject to any disclaimer, the term of this patent is extended or adjusted under 35 U.S.C. 154(b) by 199 days.

(21) Appl. No.: 13/656,510

(22) Filed: Oct. 19, 2012

(65) Prior Publication Data

US 2014/0115282 A1    Apr. 24, 2014

(51) Int. Cl.
G06F 12/00 (2006.01)
G06F 12/16 (2006.01)
G06F 17/30 (2006.01)
G06F 11/20 (2006.01)

(52) U.S. Cl.
CPC .......... *G06F 12/16* (2013.01); *G06F 17/30215* (2013.01); *G06F 11/2094* (2013.01)

(58) Field of Classification Search
CPC .................... G06F 17/30377; G06F 17/30227; G06F 12/16
USPC ................................................. 711/162, 165
See application file for complete search history.

(56) References Cited

U.S. PATENT DOCUMENTS

| 2006/0137013 A1* | 6/2006 | Lok ................................. 726/24 |
| 2011/0082996 A1* | 4/2011 | Wester et al. ................. 711/170 |
| 2011/0161294 A1* | 6/2011 | Vengerov et al. ............. 707/637 |
| 2011/0302583 A1* | 12/2011 | Abadi et al. ................. 718/102 |

OTHER PUBLICATIONS

Dean et al., MapReduce: Simplified Data Processing on Large Clusters, Jan. 2008, Communications of the ACM, vol. 51, Issue 1, pp. 107-113.*

Shvachko et al., The Hadoop Distributed File System, May 2010, IEEE 26th Symposium on Mass Storage Systems and Technologies (MSST), pp. 1-10.*

MapReduce—Wikipedia, the free encyclopedia, pp. 1-8, Retrieved from the Internet: http://en.wikipedia.org/wiki/MapReduce, Oct. 19, 2012.

Wikipedia, "Apache Hadoop" downloaded from http://en.wikipedia.org/wiki/Apache_Hadoop last modified on Nov. 5, 2014.

* cited by examiner

*Primary Examiner* — Gurtej Bansal
(74) *Attorney, Agent, or Firm* — Weaver Austin Villeneuve & Sampson LLP

(57) ABSTRACT

In one embodiment, data generated via a map process and/or reduce process may be obtained. A request message may be sent to a server, where the request message indicates a request for a location in storage at which the data is to be stored. Upon receiving the location from the server, the data may be copied to the location in the storage. A commit message may be sent to the server, where the commit message indicates that the data has been copied to the location. In addition, the data may be deleted.

21 Claims, 7 Drawing Sheets

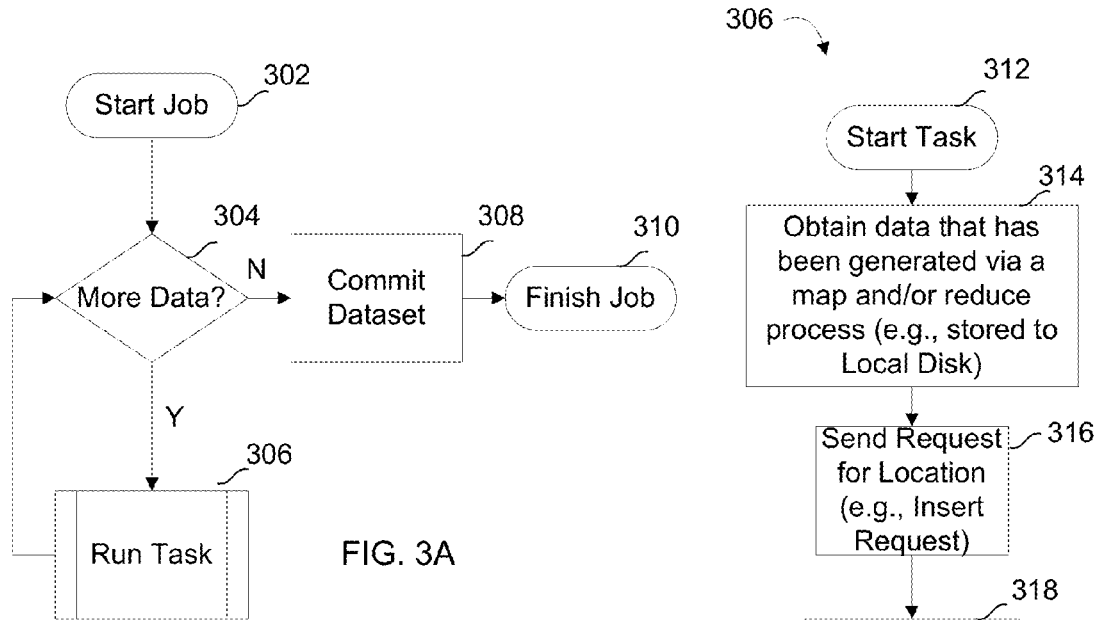
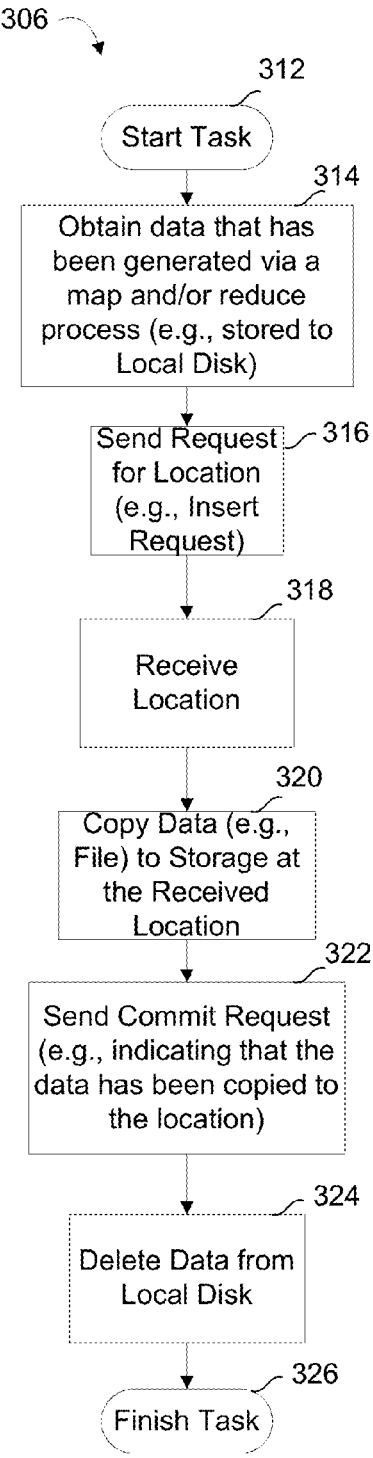
FIG. 3A
FIG. 3B

WRITING DATA FROM HADOOP TO OFF GRID STORAGE

BACKGROUND OF THE INVENTION

The disclosed embodiments relate generally to methods and apparatus for storing data from Hadoop to a separate storage system.

MapReduce is a programming model for processing large data sets, and the name of an implementation of the model by Google. The model is inspired by the map and reduce functions commonly used in functional programming. MapReduce is often applied to perform distributed computing on clusters of computers. One popular free implementation of MapReduce is provided via Apache Hadoop.

MapReduce is a framework for processing parallel problems across huge datasets using a large number of computers (e.g., nodes). The nodes may be collectively referred to as a cluster (if all nodes are on the same local network and use similar hardware) or a grid (if the nodes are shared across geographically and administratively distributed systems, and use more heterogenous hardware). Computational processing can occur on data stored either in a filesystem (unstructured) or in a database (structured). MapReduce can take advantage of locality of data, processing data on or near the storage assets to decrease transmission of data.

The MapReduce functionality is provided via two distinct steps: a map step and a reduce step. In the map step, a master node takes the input, divides it into smaller sub-problems, and distributes them to worker nodes. A worker node may do this again in turn, leading to a multi-level tree structure. The worker node processes the smaller problem, and passes the answer back to its master node. In the reduce step, the master node then collects the answers to all the sub-problems and combines them in some way to form the output—the answer to the problem it was originally trying to solve.

Data that is generated via the map and reduce steps of Hadoop is typically stored in the Hadoop Distributed File System (HDFS). The HDFS is a distributed, scalable, and portable filesystem written in Java for the Hadoop framework. HDFS stores large files across multiple machines. With the default replication value, 3, data is stored on three data nodes: two on the same rack, and one on a different rack. Data nodes can talk to each other to rebalance data, to move copies around, and to keep the replication of data high.

SUMMARY OF THE INVENTION

The disclosed embodiments enable data from a system implementing MapReduce functionality such as Hadoop to be stored to an external storage system. This may be accomplished, in part, through the use of a server in communication with Hadoop. More particularly, the server may respond to queries from Hadoop with location(s) in the external storage system in which data may be stored.

In accordance with one embodiment, a network device may obtain data generated via at least one of a map process or reduce process. The network device may send a request message to a server, where the request message indicates a request for a location in storage at which the data is to be stored. The network device may receive the location from the server. The network device may copy the data to the location in the storage. The network device may then send a commit message to the server, where the commit message indicates that the data has been copied to the location. In addition, the network device may delete the data. More particularly, where the network device obtains the data from a disk of the network device, the network device may delete the data from the disk of the network device.

In accordance with yet another embodiment, the network device may be one of a plurality of network devices in a Hadoop grid or cluster (e.g., of a Hadoop Distributed File System). More particularly, each of the plurality of network devices may be configured to perform processing such as map and/or reduce functionality.

In accordance with yet another embodiment, a system may include a job tracker node, two or more task tracker nodes, and one or more Map-Reduce nodes capable of performing map and/or reduce functionality. The system may launch a job by assigning the job to a job tracker node. The job tracker node may be configured to divide a job into two or more tasks and assign the tasks to two or more task tracker nodes. Each of the task tracker nodes may be configured to initiate its assigned task(s) via at least one Map-Reduce Node configured to perform a map process and/or reduce process.

In accordance with yet another embodiment, a node such as a Map-Reduce Node may obtain data generated via at least one of a map process or reduce process and send a request message to a server, where the request message indicates a request for a location in storage at which the data is to be stored. Moreover, the Map-Reduce node may receive the location from the server, copy the data to the location in the storage, and send a commit message to the server, where the commit message indicates that the data has been copied to the location. In addition, since the data may also be stored locally, each of the Map-Reduce nodes may delete the data (e.g., from the pertinent Map-Reduce node).

In accordance with yet another embodiment, the system may be further configured to send a commit dataset message to the server upon completion of the job such that the server is notified that all data associated with the job has been copied to the storage. More particularly, the system may be configured to send the commit dataset message upon receiving notification that the two or more task tracker nodes have completed processing of the two or more tasks.

In accordance with yet another embodiment, a server may receive a request message, where the request message indicates a request for a location in storage at which data is to be stored. The server may provide a location at in response to the request message. The server may receive a commit message indicating that the data has been copied to the location. The server may update location information to indicate that the data is stored at the location.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIGS. 3A-3B are process flow diagrams that together illustrate a method of processing a job and corresponding tasks, respectively, in accordance with various embodiments.

DETAILED DESCRIPTION OF THE SPECIFIC EMBODIMENTS

Figure 1:
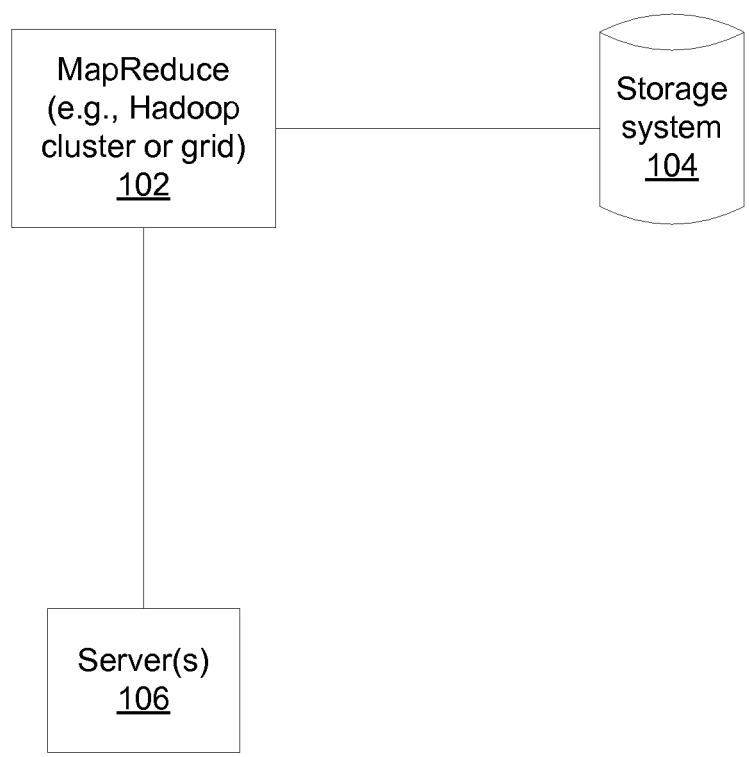
FIG. 1 is a schematic diagram illustrating an example system in which various embodiments may be implemented.

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the disclosed embodiments. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

With the popularity of Hadoop, it is desirable to leverage processing capabilities such as the MapReduce functionality of Hadoop. However, many companies have existing long-term storage systems. As a result, it would be beneficial to continue to store data in the existing storage systems. Unfortunately, there fails to be a mechanism for storing data generated via a Hadoop grid or cluster to such an external storage system.

In accordance with various embodiments, MapReduce functionality such as that provided via Hadoop MapReduce is leveraged to process tasks. However, instead of storing data that is generated via MapReduce to an internal file system such as the HDFS, the data may be stored to a separate, external storage system.

System

FIG. 1 is a block diagram illustrating an example system in which various embodiments may be implemented. As shown in FIG. 1, MapReduce functionality may be provided via a MapReduce system 102 including a plurality of network devices, which may be implemented via a network. More particularly, the system 102 may include a Hadoop cluster or grid 102 (e.g., HDFS). In addition, data generated via the Hadoop cluster or grid 102 may be offloaded from the Hadoop cluster or grid 102 and stored to a separate, external storage system 104. Thus, the data that is typically stored locally in the Hadoop cluster or grid 102 may stored to a separate storage system 104, which may be remotely located.

Hadoop MapReduce is a way to split every request (e.g., job) into smaller requests (e.g., tasks) which can be sent to a plurality of servers, allowing a scalable use of Central Processing Unit (CPU) power. More particularly, Hadoop provides a MapReduce engine, which includes a JobTracker, to which client applications may submit MapReduce jobs. The JobTracker may distribute tasks to available TaskTracker nodes in a cluster of TaskTracker nodes, generally striving to keep the work as close to the data as possible. With a rack-aware filesystem, the JobTracker is typically aware of which node contains the data for a particular task, and which other machines are nearby. If a task cannot be hosted on the actual node where the data for that task resides, priority is given to nodes in the same rack.

An advantage of using HDFS is data awareness between the jobtracker and tasktracker(s). The jobtracker typically schedules map/reduce jobs to tasktrackers with an awareness of the data location of data being processed. An example of this would be if node A contained data (x,y,z) and node B contained data (a,b,c). The jobtracker may schedule node B to perform map/reduce tasks on (a,b,c) and may schedule node A to perform map/reduce tasks on (x,y,z). In this manner, Hadoop MapReduce may reduce the amount of traffic that goes over the network and prevent unnecessary data transfer. Unfortunately, when Hadoop is used with other filesystems, this advantage is not always available.

The storage system 104 may be implemented via one or more storage appliances. In accordance with one embodiment, the storage system 104 may be implemented via NetApp filer, which is also known as NetApp Fabric Attached Storage (FAS) or Network Attached Storage (NAS). NetApp filers typically implement their physical storage in large disk arrays.

The storage system 104 may provide storage over a network using file-based protocols such as Network File System (NFS), Common Internet File System (CIFS), File Transfer Protocol (FTP), Trivial File Transfer Protocol (TFTP), and Hypertext Transfer Protocol (HTTP). The storage system 104 may also serve data over block-based protocols such as Fibre Channel (FC), Fibre Channel over Ethernet (FCoE) and Internet Small Computer System Interface (iSCSI).

Since a Hadoop cluster or grid generally provides long-term storage, there fails to be a mechanism for storing data generated via the Hadoop cluster or grid to a separate, external storage system. In accordance with various embodiments, a set of one or more servers 106 supports queries from the Hadoop cluster or grid 102 pertaining to location(s) of specific data and/or categories of data. In addition, the servers 106 may store location information indicating a location in which specific data and/or categories of data are stored within the storage system 104.

In accordance with various embodiments, each network device (e.g., server) within the Hadoop cluster or grid may operate as described in further detail below. More particularly, nodes such as Map-Reduce nodes may be configured to communicate with the servers 106 to determine the appropriate location in which specific data and/or categories of data are to be stored in the storage system 104. Similarly, the Map-Reduce nodes may be configured to offload data from the Hadoop cluster or grid by storing data to the location in the storage system 104, as provided by the servers 106.

By separating processing via Hadoop and long term storage via a separate storage system, it is possible to scale processing and storage separately. More particularly, it is possible to purchase additional devices for processing capability as Central Processing unit (CPU) use increases. Similarly, it is possible to purchase storage appliances such as NetApp filers as storage use increases. Accordingly, the disclosed embodiments allow for improved resource utilization and reduced costs.

Map and Reduce Functionality

The Map and Reduce functions of MapReduce may both be defined with respect to data structured in (key, value) pairs. More particularly, Map typically takes one pair of data with a type in one data domain, and returns a list of pairs in a different domain: Map (k1, v1)→list (k2, v2)

The Map function may be applied in parallel to every pair of data in an input dataset. Thus, for each Map function call, a different list of pairs may be produced. The MapReduce framework may then collect all pairs with the same key from all lists and group them together, thus creating one group for each one of the different generated keys.

The Reduce function may be applied in parallel to each group, which may produce a collection of values in the same domain:

Reduce(k2, list (v2))→list (v3)

Each Reduce call typically produces either one value v3 or an empty return, though one Reduce call is allowed to return more than one value. The returns of all Reduce function calls may be collected as the desired result list.

As described above, the MapReduce framework may transform a list of (key, value) pairs into a list of values. This behavior is different from the typical functional programming map and reduce combination, which accepts a list of arbitrary values and returns one single value that combines all the values returned by map.

Distributed implementations of MapReduce may be implemented by connecting the processes performing the Map and Reduce phases. In accordance with one embodiment, the Map and Reduce phases may be connected via a distributed file system such as HDFS. Alternatively, other options are possible, such as direct streaming from mappers to reducers, or for the mapping processors to serve up their results to reducers that query them.

Processes

Figure 2:
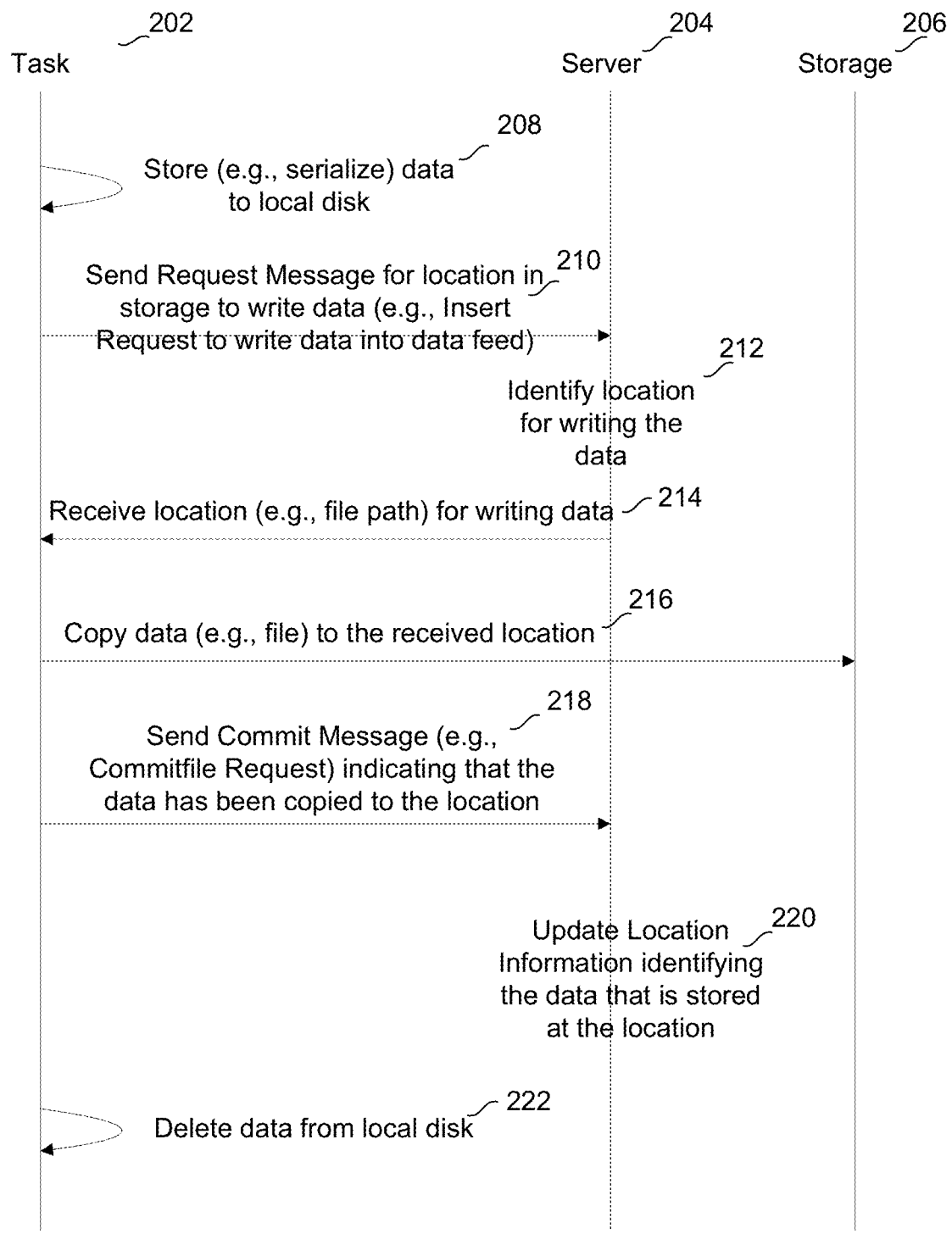
FIG. 2 is a transaction flow diagram illustrating an example method of processing a task by offloading data generated via map and/or reduce functionality from Hadoop to a separate storage system.

FIG. 2 is a transaction flow diagram illustrating an example process for storing data from a Hadoop grid or cluster to an external storage system in accordance with various embodiments. A job that is running may generate data to be offloaded from the Hadoop grid or cluster. More particularly, the job may be divided into one or more tasks to be executed, where each task may obtain and/or generate data. Each task may be initiated via a separate TaskTracker node. Processes performed by a node (e.g., network device) such as a Map-Reduce node executing a task, server(s), and a storage system are represented by vertical lines 202, 204, 206, respectively. The Map-Reduce node may be a Hadoop network device (e.g., server).

The storage system may include one or more storage devices. The storage system may be separate from the server and the network device via which the task is processed. More particularly, the storage system may be remotely located from the server and/or network device via which the task is processed.

The node 202 may execute map and/or reduce functionality in accordance with a particular task, and may obtain data generated via the map and/or reduce process. More particularly, the node 202 may perform a map process and/or reduce process on data according to the task received from a JobTracker. Typically, the task stores the data to a memory (e.g., local disk) of the node 202) where the task is running, as shown at 208. More particularly, the task 202 may serialize the data to the local disk. However, the data may also be stored to another network device within the MapReduce system.

The node 202 executing the task may send a request message 210 (e.g., Insert Request) to the server 204 indicating a request to write data to the storage system. More particularly, the request message 210 may indicate a request to write data into a data feed. Thus, the request message 210 may indicate a request for a location in storage at which the data is to be stored.

The request message 210 may include one or more parameters indicating metadata pertaining to the data being stored. For example, the parameters may include a date stamp, a date, a year, a month, a day, an hour, a time, and/or a time period. Since the storage system may store data in tables, the parameters may indicate one or more tables in which the data is to be stored.

In response to the request message 210, the server 204 may identify one or more locations in the storage system at which the data is to be stored at 212. More particularly, the location(s) may correspond to the metadata provided in the request message. For example, the location(s) may indicate or otherwise identify one or more tables in which the data is to be stored.

The server 204 may then provide the location(s) for writing the data to the task at 214. The location may indicate a file path. In addition, the location may include information such as an identifier and/or location of one or more tables. More particularly, the location may indicate or otherwise identify a storage device and/or a table stored at the storage device. Moreover, the location may further indicate a date or date range within the table.

Upon receiving the location(s) from the server at 214, the node 202 may copy the data (e.g., file) to the location in the storage 206 at 216. Once the data has been copied to the location(s), the node 202 may send a commit message (e.g., Commitfile Request) to the server 204 at 218. The commit message may indicate that the data has been copied to the location(s), and can therefore be made available to other systems or processes that may wish to read data from the storage.

Upon receiving the commit message, the server 204 may store or update its location information to indicate that the data is stored at the location at 220. Since the data has been copied to the location(s), the node 202 may delete the data that was stored at 208 from the Hadoop grid or cluster. More particularly, the node 202 may delete the data stored at 208 from the local disk at 222 (or from another network device within the MapReduce system).

FIG. 3A is a process flow diagram illustrating an example method of processing a job in accordance with various embodiments. A network device external to or within the MapReduce system such as a server in a Hadoop grid or cluster may start a job at 302. If the network device determines at 304 that there is more data to process, the network device may run a task at 306. More particularly, the network device may divide a job into two or more tasks, which may be assigned among two or more TaskTracker nodes. If all data has been processed, the network device may send a commit dataset message to the server at 308 (e.g., upon completion of the job), where the commit dataset message indicates that all data associated with the job that is to be offloaded from the Hadoop grid or cluster has been copied to the storage system. More particularly, the network device may send the commit dataset message to the server upon receiving a notification (e.g., from the TaskTracker nodes) that processing associated with the tasks has been completed. Upon receiving the commit dataset message, the server may enable the data that has been copied to the storage system to be readable by other processes or systems. This may be accomplished, for example, by updating the location information maintained by the server. The job may be completed at 310.

FIG. 3B is a process flow diagram illustrating an example method of processing a task in accordance with various embodiments. The task may be processed by a network device (e.g., Map-Reduce node) in the MapReduce system such as a server of a Hadoop grid or cluster. More particularly, the network device may be one of a plurality of network devices of a HDFS. A network device may start a task at 312. The network device may obtain data that has been generated via at least one of a map process or reduce process (in accordance with the assigned task at 314. More particularly, the data that has been generated may be stored (e.g., serialized) to a memory (e.g., local disk) of the network device (or to another network device within the MapReduce system). The network device may send a request message (e.g., Insert Request message) to a server at 316, where the request message indicates a request for a location in storage at which the data is to be stored. The network device may receive the location from the server at 318. The network device may copy the data (e.g., file) to the storage at the previously received location at 320. The network device may send a commit message to the server at 322, where the commit message indicates that the data has been copied to the location. The network device may delete the data from the MapReduce system (e.g., from the local disk of the network device or from another network device within the MapReduce system) at 324. The task may be completed at 326.

Figure 3C:
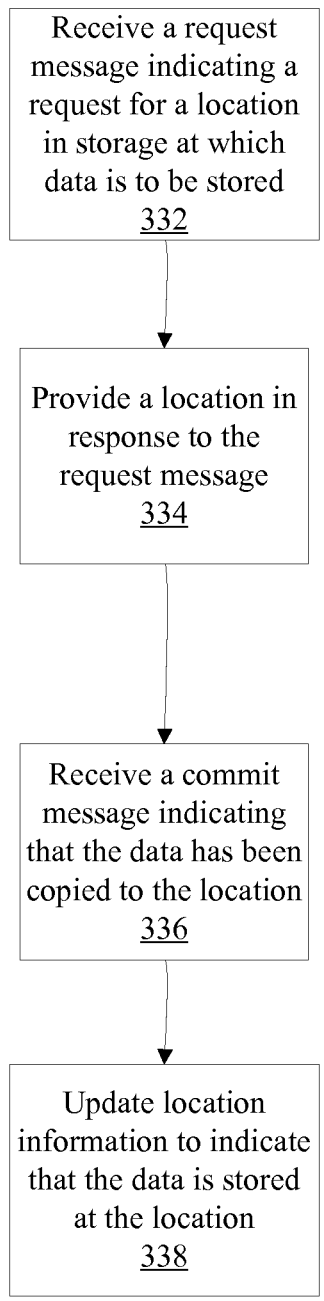
FIG. 3C is a process flow diagram illustrating an example method of implementing a server in accordance with various embodiments.

FIG. 3C is a process flow diagram illustrating an example method of implementing a server in accordance with various embodiments. The server may receive a request message at 332, where the request message indicates a request for a location in storage at which data is to be stored. The server may provide a location at 334 in response to the request message. The server may receive a commit message indicating that the data has been copied to the location at 336. The server may update location information to indicate that the data is stored at the location at 338. In addition, the server may further update the location information to indicate that the data is accessible to requesting devices.

Through the disclosed embodiments, data processing may occur on a Hadoop cluster or grid, while long-term storage may be provided via a separate storage system. Accordingly, processing and long-term storage inherent to Hadoop may be decoupled.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 4:
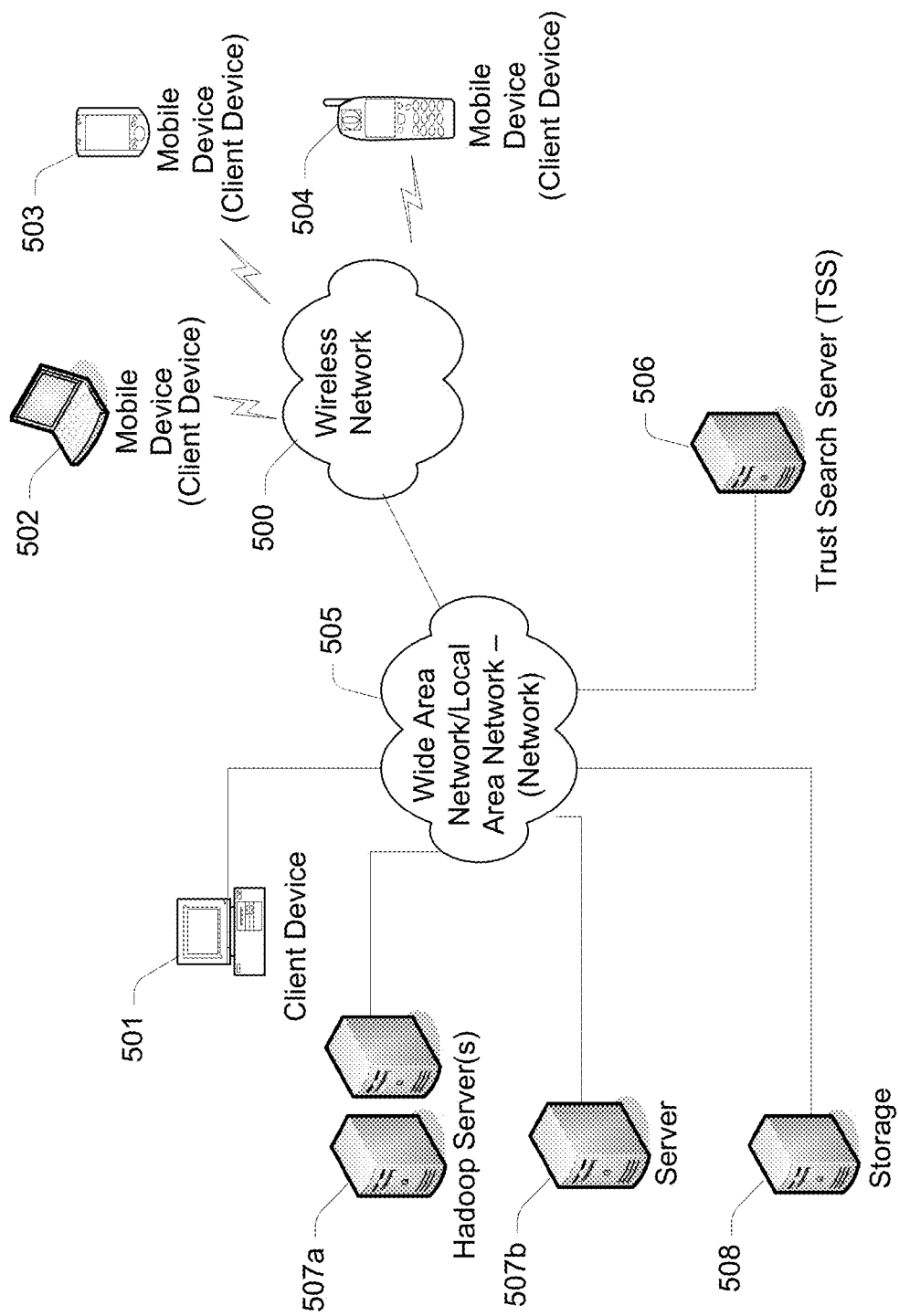
FIG. 4 is a schematic diagram illustrating an example embodiment of a network in which various embodiments may be implemented.

The disclosed embodiments may be implemented in any of a wide variety of computing contexts. FIG. 4 is a schematic diagram illustrating an example embodiment of a network.

Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 505 and wireless network 500, a variety of devices, such as client devices 501-504, and a variety of servers such as server(s) 507 and search server 506. The server(s) 507 may include one or more network devices of a MapReduce system. For example, the server(s) 507 may include one or more Hadoop servers 507a. In addition, the servers 507 may include a server 507b configured to maintain location information, and communicate with network devices such as Hadoop servers 507a to provide location information pertaining to data that has been stored or is to be stored at the storage system 508, as described herein. The servers may also include a content server and/or ad server (not shown). The servers 507 may be associated with a web site such as a social networking web site. Examples of social networking web sites include Yahoo, Facebook, Tumblr, LinkedIn, Flickr, and Meme.

As shown in this example, the client devices 501-504 capable of accessing the storage system 508 may include one or more mobile devices 502, 503, 504. Client device(s) 501-504 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The offloading of data from a MapReduce system such as a Hadoop grid or cluster may be implemented according to the disclosed embodiments in some centralized manner. This is represented in FIG. 4 by server(s) 507b, which may correspond to multiple distributed devices and data store(s). The server(s) 507b and/or corresponding data store(s) may store location information including a location and corresponding metadata identifying the data stored at the location in storage.

The servers may also enable a web site to provide a variety of services to its users. More particularly, users of the web site may maintain public user profiles, interact with other members of the web site, upload media (e.g., photographs, videos), etc. In addition, the web site may be a search engine provider.

The servers may have access to one or more user logs (e.g., user databases) into which user information is retained. This user information or a portion thereof may be referred to as a user profile. More particularly, the user profile may include public information that is available in a public profile and/or private information. The user logs may be retained in one or more memories that are coupled to the servers.

The user information retained in the user logs may include personal information such as demographic information (e.g., age and/or gender) and/or geographic information (e.g., residence address, work address, and/or zip code). In addition, each time a user performs online activities such as clicking on an advertisement or purchasing goods or services, information regarding such activity or activities may be retained as user data in the user logs. For instance, the user data that is retained in the user logs may indicate the identity of web sites visited, identity of ads that have been selected (e.g., clicked on) and/or a timestamp. Moreover, information associated with a search query, such as search term(s) of the search query, information indicating characteristics of search results that have been selected (e.g., clicked on) by the user, and/or associated timestamp may also be retained in the user logs. A user may be identified in the user logs by a user ID (e.g., user account ID), information in a user cookie, etc.

In one embodiment, as an individual interacts with a software application, e.g., an instant messenger or electronic mail application, descriptive content, such in the form of signals or stored physical states within memory, such as, for example, an email address, instant messenger identifier, phone number, postal address, message content, date, time, etc., may be identified. Descriptive content may be stored, typically along with contextual content. For example, how a phone number came to be identified (e.g., it was contained in a communication received from another via an instant messenger application) may be stored as contextual content associated with the phone number. Contextual content, therefore, may identify circumstances surrounding receipt of a phone number (e.g., date or time the phone number was received) and may be associated with descriptive content. Contextual content, may, for example, be used to subsequently search for associated descriptive content. For example, a search for phone numbers received from specific individuals, received via an instant messenger application or at a given date or time, may be initiated.

Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

Data processed via various jobs or tasks may include content such as that described herein. The data that is output from the jobs or tasks may be deleted from local memory of the MapReduce system (e.g., Hadoop grid or cluster) and stored to a separate, external storage system, as disclosed herein. Upon making the data stored at the storage system available to other systems or processes, the data that is stored at the storage system may be queried. More particularly, it is possible to query the server 507b for the location of data having specific metadata attributes. Upon receiving the location, the data may be retrieved from the storage system 508 at the location.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 5:
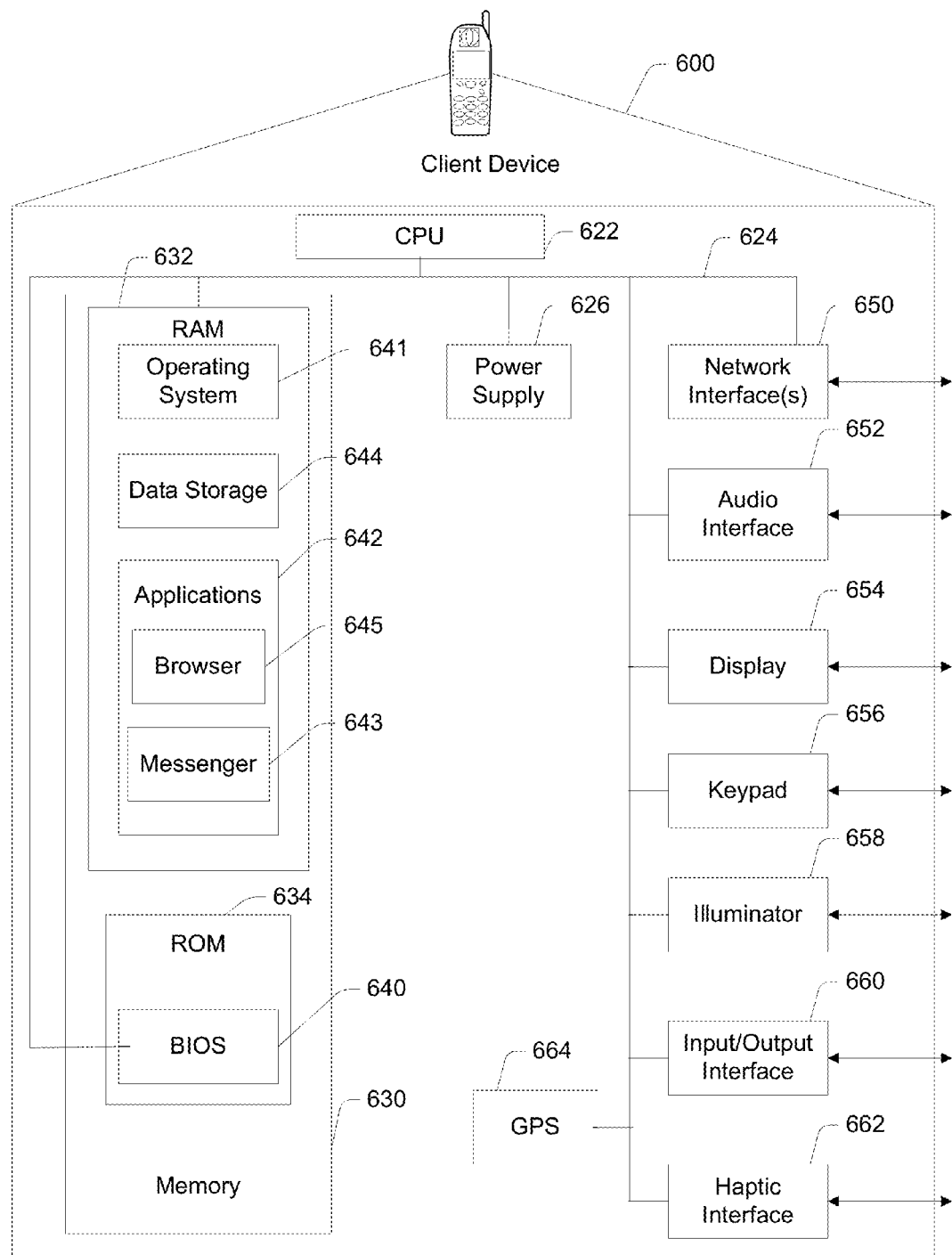
FIG. 5 is a schematic diagram illustrating an example client device in which various embodiments may be implemented.

A user may access data stored in the storage system via a client device. FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

As shown in this example, a client device 600 may include one or more central processing units (CPUs) 622, which may be coupled via connection 624 to a power supply 626 and a memory 630. The memory 630 may include random access memory (RAM) 632 and read only memory (ROM) 634. The ROM 634 may include a basic input/output system (BIOS) 640.

The RAM 632 may include an operating system 641. More particularly, a client device may include or may execute a variety of operating systems, including a personal computer operating system, such as a Windows, iOS or Linux, or a mobile operating system, such as iOS, Android, or Windows Mobile, or the like. The client device 600 may also include or may execute a variety of possible applications 642 (shown in RAM 632), such as a client software application such as messenger 643, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 600 may also include or execute an application to communicate content, such as, for example, textual content, multimedia content, or the like, which may be stored in data storage 644. A client device may also include or execute an application such as a browser 645 to perform a variety of possible tasks, such as browsing, searching, playing various forms of content, including locally stored or streamed video, or games (such as fantasy sports leagues).

The client device 600 may send or receive signals via one or more interface(s). As shown in this example, the client device 600 may include one or more network interfaces 650. The client device 600 may include an audio interface 652. In addition, the client device 600 may include a display 654 and an illuminator 658. The client device 600 may further include an Input/Output interface 660, as well as a Haptic Interface 662 supporting tactile feedback technology.

The client device 600 may vary in terms of capabilities or features. Claimed subject matter is intended to cover a wide range of potential variations. For example, a cell phone may include a keypad such 656 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 664 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 6:
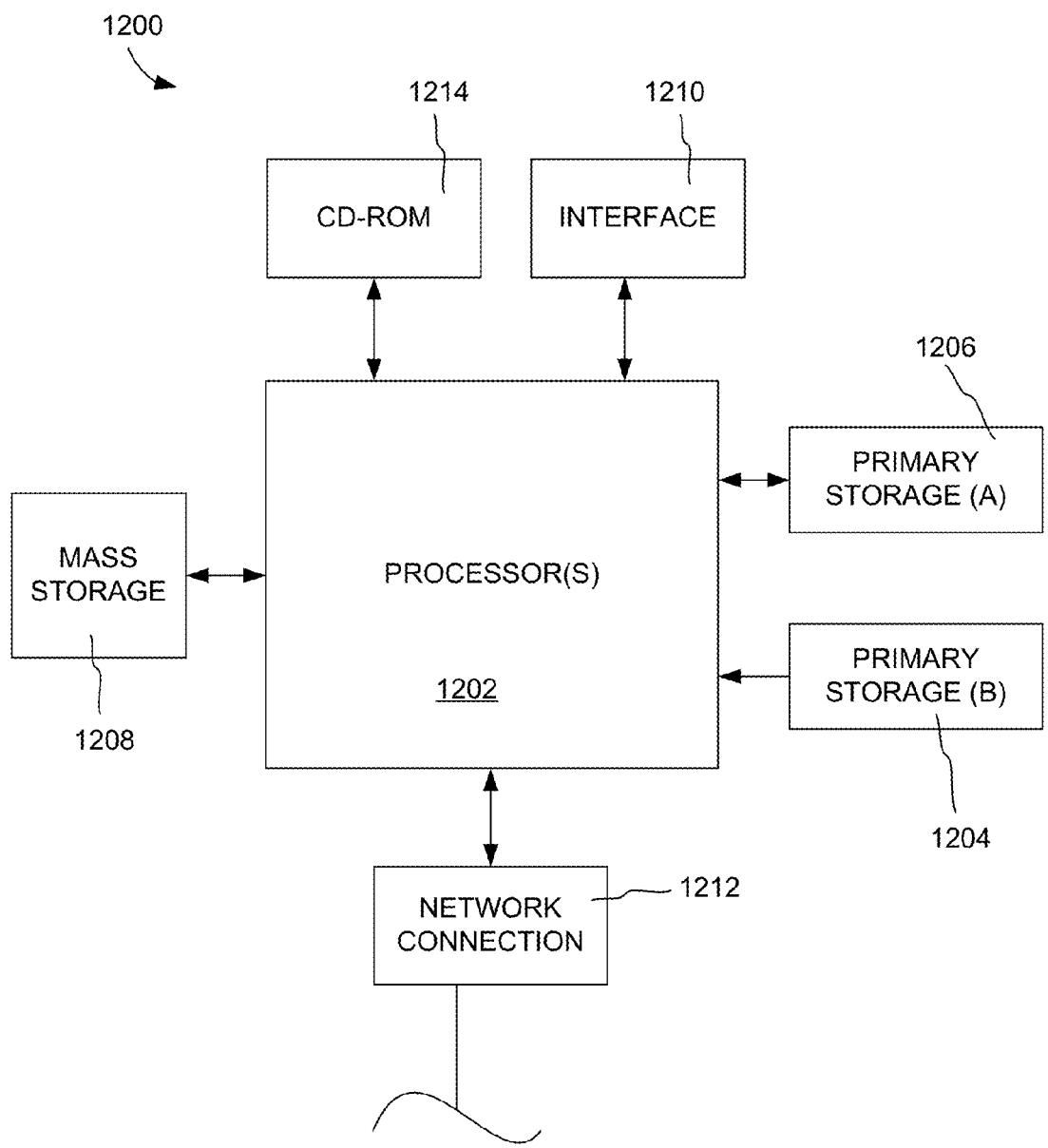
FIG. 6 is a schematic diagram illustrating an example computer system in which various embodiments may be implemented.

The disclosed embodiments may be implemented via a general purpose machine such as that illustrated in FIG. 6. More particularly, processes performed via a server, MapReduce system device (e.g., Hadoop network device), and/or storage system device may be implemented via a general purpose machine. FIG. 6 illustrates a typical computer system that, when appropriately configured or designed, can serve as a system of this invention. The computer system 1200 may include any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
obtaining data generated via at least one of a map process or reduce process of a File System;
storing the data;
sending, by a network device of the File System, a request message to a server, the request message indicating a request for a location in storage at which the data is to be stored;
receiving, by the network device, the location from the server;
copying, by the network device, the data to the location in the storage;
sending, by the network device, a commit message to the server, the commit message indicating that the data has been copied to the location; and
deleting the data;
wherein the storage is external to the File System.

2. The method as recited in claim 1, wherein the File System is a Hadoop Distributed File System (HDFS).

3. The method as recited in claim 1, wherein the server is external to the File System.

4. The method as recited in claim 1, wherein the File System is a Hadoop Distributed File System (HDFS), wherein obtaining the data comprises obtaining the data by the network device, wherein storing the data comprises storing the data to a disk of the network device, and wherein deleting the data comprises deleting the data from the disk of the network device.

5. The method as recited in claim 1, wherein the storage comprises one or more storage devices, the storage being separate from the server.

6. The method as recited in claim 1, wherein the location indicates at least one of a storage device, a table, a date, or a date range.

7. The method as recited in claim 1, further comprising:
in response to the request message, identifying by the server the location in the storage at which the data is to be stored.

8. The method as recited in claim 1, further comprising:
in response to the commit message, updating location information by the server to indicate that the data is stored at the location.

9. The method as recited in claim 1, wherein the File System comprises a plurality of network devices, the plurality of network devices including the network device.

10. The method as recited in claim 1, wherein the request message comprises one or more parameters indicating metadata pertaining to the data, and wherein the location corresponds to the metadata.

11. The method as recited in claim 10, wherein the parameters indicate at least one of a table, a date stamp, a date, a year, a month, a day, an hour, a time, or a time period.

12. A non-transitory computer-readable medium storing thereon computer-readable instructions, comprising:
instructions for obtaining and storing data generated via at least one of a map process or reduce process by a network device of a File System such that the data is stored within the File System;
instructions for sending, by the network device, a request message to a server, the request message indicating a request for a location in storage at which the data is to be stored;
instructions for copying, by the network device, the data to the location in the storage after the location is received from the server;
instructions for sending, by the network device a commit message to the server, the commit message indicating that the data has been copied to the location; and
instructions for deleting the data by the network device;
wherein the storage is external to the File System.

13. The non-transitory computer-readable medium as recited in claim 12, further comprising:
instructions for performing at least one of a map process or reduce process on data according to a task received from a JobTracker.

14. An apparatus, comprising:
a processor; and
a memory, at least one of the processor or the memory being configured for:
obtaining and storing, by a network device of a File System, data generated via at least one of a map process or reduce process of the File System;
sending a request message, by the network device to a server, the request message indicating a request for a location in storage at which the data is to be stored;
receiving, by the network device the location from the server;
copying the data, by the network device to the location in the storage;
sending, by the network device a commit message to the server, the commit message indicating that the data has been copied to the location; and
deleting the data;
wherein the storage is external to the File System.

15. The apparatus as recited in claim 14, wherein storing the data comprises storing the data in the memory;
wherein deleting the data comprises deleting the data from the memory.

16. The apparatus as recited in claim 14, wherein obtaining data, sending a request message, receiving the location, copying the data, sending the commit message, and deleting the data are performed in association with a particular task.

17. The apparatus as recited in claim 14, wherein the request message comprises one or more parameters indicating metadata pertaining to the data, and wherein the location corresponds to the metadata.

18. A system, comprising:
a job tracker node, the job tracker node configured to divide a job into two or more tasks;
two or more task tracker nodes, the job tracker node being configured to assign the two or more tasks to the two or more task tracker nodes, each of the two or more task tracker nodes being configured to initiate each of the two or more tasks; and
one or more Map-Reduce nodes of a File System, each of the Map-Reduce nodes being configured to:
obtain and store data generated via at least one of a map process or reduce process of the File System;
send a request message to a server, the request message indicating a request for a location in storage at which the data is to be stored;
receive the location from the server;
copy the data to the location in the storage;
send a commit message to the server, the commit message indicating that the data has been copied to the location; and
delete the data;
wherein the storage is external to the File System.

19. The system as recited in claim 18, further comprising:
a processor; and
a memory, at least one of the processor or the memory being configured to send a commit dataset message after completion of the job to the server such that the server is notified when all data associated with the job has been copied to the storage.

20. An apparatus, comprising:
a processor; and
a memory, at least one of the processor or the memory being adapted for:
receiving a request message, by a server, from a device of a File System, the request message indicating a request for a location in storage at which data generated via at least one of a map process or reduce process of the File System is to be stored;
providing a location, by the server, to the device in response to the request message;
receiving a commit message, by the server, from the device, the commit message indicating that the data has been copied by the device to the location; and
storing or updating location information, by the server, to indicate that the data generated via at least one of a map process or reduce process of the File System is stored at the location;
wherein the storage is external to the File System;
wherein the server is external to the File System.

21. The apparatus as recited in claim 20, at least one of the process or the memory being further adapted for performing steps, further comprising:
updating the location information to indicate that the data is accessible to requesting devices.

\* \* \* \* \*